(12) United States Patent
Shackleford et al.

(10) Patent No.: US 11,423,871 B2
(45) Date of Patent: Aug. 23, 2022

(54) ACOUSTIC PANELS AND METHODS FOR PREPARING THEM (71) Applicant: CertainTeed Ceilings Corporation, Malvern, PA (US)

(72) Inventors: David Shackleford, Framingham, MA (US); Sizhu You, Auburndale, MA (US); Steven Jacek, Boylston, MA (US); Phillip Evans, Littleton, MA (US); Alexis Rile, Cincinnati, OH (US); Michael J. Lembo, Souderton, PA (US)

(73) Assignee: CertainTeed Ceilings Corporation, Malvern, PA (US)

( * ) Notice: Subject to any disclaimer, the term of this patent is extended or adjusted under 35 U.S.C. 154(b) by 346 days.

(21) Appl. No.: 16/514,768

(22) Filed: Jul. 17, 2019

(65) Prior Publication Data

US 2020/0027436 A1 Jan. 23, 2020

Related U.S. Application Data (60) Provisional application No. 62/699,570, filed on Jul. 17, 2018.

(51) Int. Cl.
*G10K 11/168* (2006.01)
*B05D 1/42* (2006.01)

(52) U.S. Cl.
CPC ............. *G10K 11/168* (2013.01); *B05D 1/42* (2013.01)

(58) Field of Classification Search
CPC .................................. B05D 1/42; G10K 11/168

(Continued)

(56) References Cited

U.S. PATENT DOCUMENTS

| 4,037,499 A | 7/1977 | Hillman |
| 6,616,804 B2 * | 9/2003 | Foster ..................... E04B 9/001 |
| | | 162/129 |

(Continued)

FOREIGN PATENT DOCUMENTS

| CN | 202108128 U | * | 1/2012 |
| WO | 2012095562 A1 | | 7/2012 |

OTHER PUBLICATIONS

International Search Report and Written Opinion in International Patent Application No. PCT/US2019/042264, dated Mar. 23, 2020.

(Continued)

*Primary Examiner* — Forrest M Phillips
(74) *Attorney, Agent, or Firm* — McDonnell Boehnen Hulbert & Berghoff LLP (57) ABSTRACT

The disclosure relates to acoustic panels and methods for preparing them. The disclosure relates more particularly to panels having a porous facing and to methods for making such panels. One aspect of the disclosure is an acoustic panel comprising a base structure. The base structure has one or more edges, an outward major surface having a total area, and an inward major surface opposing the outward major surface. The base structure has a noise reduction coefficient (NRC) of at least about 0.3. The panel includes a coating layer directly disposed on the outward major surface of the base structure, the coating layer being formed of an open-cell foam. The coating layer has an exterior major surface opposing the outward major surface of the base structure. The coating layer is substantially scattering for light in the wavelength range of 380 nm to 780 nm, and has an absorption coefficient of less than 0.5 for acoustic frequencies in the range of 100 Hz to 10,000 Hz.

23 Claims, 1 Drawing Sheet (58) Field of Classification Search
USPC .......................................................... 181/286
See application file for complete search history.

(56) References Cited

U.S. PATENT DOCUMENTS

| | | | |
|---|---|---|---|
| 8,100,226 B2 | 1/2012 | Cao | |
| 8,684,134 B2* | 4/2014 | Dugan | ................... E04C 2/043 |
| | | | 181/290 |
| 10,279,548 B2* | 5/2019 | Wilson | ...................... B32B 5/06 |
| 11,056,092 B2* | 7/2021 | Weston | ................... B32B 27/12 |
| 2007/0277948 A1 | 12/2007 | Carbo | |
| 2010/0065366 A1* | 3/2010 | Soltau | .................. G10K 11/168 |
| | | | 181/286 |
| 2010/0124653 A1* | 5/2010 | Tadros | ..................... B32B 5/18 |
| | | | 428/316.6 |
| 2011/0155019 A1* | 6/2011 | Albright | ............. C04B 40/0046 |
| | | | 106/675 |
| 2013/0133978 A1 | 5/2013 | Borroni | |
| 2015/0008281 A1* | 1/2015 | Perazzolo | ............... B64C 1/066 |
| | | | 244/1 N |

OTHER PUBLICATIONS

Vogl Deckensysteme, "Perforated Patterns Standard," available at https://www.vogl-deckensysteme.de/en/products/Dverview_perforation-patterns_neu.php, accessed Jun. 27, 2018.
Long Range, "Perofrated Islamic images related patterns," available at http://www.longrange.com.tw/Product/More?id-51#ad-image-0, accessed Jun. 27, 2018.
Guangzhou Ousilong Building Technology Col., Ltd, "Suspended Acoustic Ceiling Tiles, Perforation Electrolytically Galvanized Sheet Steel," available at http://www.suspendedmetalceiling.com/sale-2937629-suspended-acoustic-ceiling-tiles-perforation-electrolytically-galvanized-sheet-steel.html, accessed Jun. 27, 2018.

* cited by examiner

Figure 1

Figure 2

ACOUSTIC PANELS AND METHODS FOR PREPARING THEM

CROSS-REFERENCE TO RELATED APPLICATIONS

This application claims the benefit of priority of U.S. Provisional Patent Application No. 62/699,570, filed Jul. 17, 2019, which is hereby incorporated herein by reference in its entirety.

BACKGROUND OF THE DISCLOSURE

Field of the Disclosure

The disclosure generally relates to acoustic panels and methods for preparing them. The disclosure relates more particularly to panels having a porous coating layer and to methods for making such panels.

Description of Related Art

Acoustic panels are useful in a number of applications to attenuate noise. For example, an interior ceiling structure can include a system of sound absorbing panels installed on a metal grid. The grid is suspended below a structural ceiling of a room to create a plenum, or air space, between the rear surface of the panels and the ceiling. The front sides of the panels are viewed from below as a dropped ceiling of the room.

Acoustic panels suitable for a ceiling structure typically comprise a lightweight material such as mineral wool, gypsum, fiberglass, wood fiber, paper, cellulose fiber, wet-laid felt, or foam. The panels can be perforated to achieve a desired acoustic absorbency. Perforating opens the plane surface and the internal structure of the acoustic panel to allow air and sound waves to move in and out of the panel.

The physical features of conventional acoustic panels such as, for example, porous fiberglass panels or perforated mineral wool panels, are typically visible, for example, when viewed from below as part of a dropped ceiling of a room. Conventional methods for obscuring the physical features of acoustic panels involve laminating a facing onto the panel, but such methods are limited, in large part because most coverings decrease the acoustic performance of the panel. Moreover, conventional facings are not cost-effective. For example, in the case of a conventional glass mat facing for an acoustic panel, the facing is formed with an expensive formaldehyde-free binder, the lamination process is itself costly, and the weight and fragility of the panels increases after lamination.

Accordingly, there remains a need for a lightweight acoustic panel having an acoustically transparent coating layer, and for a simple, cost-effective method for preparing such panels.

SUMMARY OF THE DISCLOSURE

In one aspect, the present disclosure provides an acoustic panel comprising:
 a base structure having one or more edges, an outward major surface having a total area, and an inward major surface opposing the outward major surface, the base structure having independently a noise reduction coefficient of at least about 0.3; and
 a coating layer directly disposed on the outward major surface of the base structure, the coating layer being formed of an open-cell foam, the coating layer having an exterior major surface opposing the outward major surface of the base structure,
 wherein the coating layer is substantially scattering for light in the wavelength range 380-780 nm, and has an absorption coefficient of less than 0.5 for acoustic frequencies in the range of 100 Hz to 10,000 Hz.

In another aspect, the present disclosure provides a method for preparing an acoustic panel according to the disclosure, comprising
 providing a base structure having one or more edges, an outward major surface having a total area, and an inward major surface opposing the outward major surface, the base structure having independently an NRC of at least about 0.3;
 coating, directly onto the outward major surface, a frothed composition comprising an aqueous suspension of one or more foamable polymers (e.g., one or more of a rubber polymer and a plastic polymer), and one or more of a dispersant, a coalescing aid, and a foaming surfactant, present in the composition in a combined amount of at least about 50%, e.g., at least about 60%, or at least about 70%, or at least about 80%, or at least about 90%; and
 drying the coated frothed composition to provide a coating layer formed of an open-cell foam, the coating layer having an exterior major surface opposing the outward major surface of the base structure.

In another aspect, the present disclosure provides a panel system comprising
 a plurality of support beams arranged in a support grid so as to form a plurality of grid openings in the support grid; and
 a plurality of panels respectively aligned with the openings of the support grid, the plurality of panels including a first acoustic panel according to claim 65, wherein the first acoustic panel is oriented such that the exterior major surface of the facing layer is facing an interior space adjacent to the support grid.

Other aspects of the disclosure will be apparent to the person of ordinary skill in the art based on the drawings and detailed description below.

DETAILED DESCRIPTION OF THE DISCLOSURE

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e., denoting somewhat more or somewhat less than the stated value or range, e.g., to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

As the person of ordinary skill in the art will appreciate, directions such as "vertical," "horizontal," "upper" and "lower" are defined relative to how the support member is to be installed, with the ceiling defined as "up."

Furthermore, numerous references have been made to patents and printed publications throughout this specification. Each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

In various aspects and embodiments, the disclosure relates to an acoustic panel having a coating layer. The disclosure demonstrates such panels to be relatively inexpensive and lightweight, and such coating layers to be acoustically transparent and obscuring of a base structure. One aspect of the disclosure is an acoustic panel comprising a base structure. The base structure has one or more edges, an outward major surface having a total area, and an inward major surface opposing the outward major surface. The base structure has independently a noise reduction coefficient (NRC) of at least about 0.3. The panel includes a coating layer directly disposed on the outward major surface of the base structure, the coating layer being formed of an open-cell foam. The coating layer has an exterior major surface opposing the outward major surface of the base structure. The coating layer is substantially scattering for light in the wavelength range of 380 nm to 780 nm, and has an absorption coefficient of less than 0.5 for acoustic frequencies in the range of 100 Hz to 10,000 Hz.

The person of ordinary skill in the art will appreciate that an "absorption coefficient" of a panel may be determined through standardized testing procedures such as, for example, ASTM C423 ("Standard Test Method for Sound Absorption and Sound Absorption Coefficients by the Reverberation Room Method"). The person of ordinary skill in the art will further appreciate that, while intended to describe the fraction of randomly incident sound power absorbed by a surface, an absorption coefficient is defined operationally, and accordingly, highly absorptive panels can have an absorption coefficient exceeding unity at one or more frequencies. As used herein, a "noise reduction coefficient" or "NRC" describes the arithmetic average (e.g., rounded to the nearest multiple of 0.05), of the absorption coefficients for a specific panel determined at 250 Hz, 500 Hz, 1000 Hz, and 2000 Hz.

Figure 1:
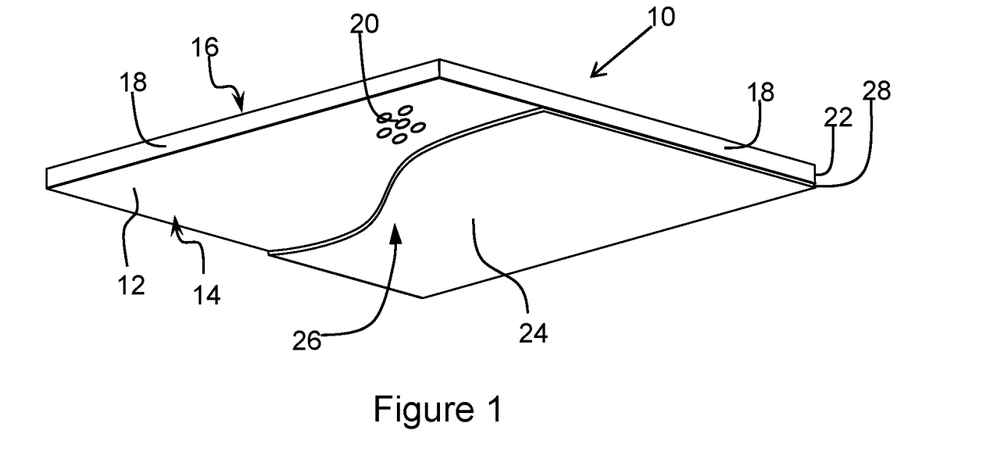
FIG. 1 is an image of an acoustic panel comprising a coating layer according to one embodiment of the disclosure.

One embodiment of the disclosure is shown in schematic view in FIG. 1. A primary component of the panel 10 is a base structure 12. The base structure 12 has an outward major surface 14, an inward major surface 16, and edges 18. In certain embodiments as otherwise described herein, the base structure comprises one or more of mineral wool, fiberglass, gypsum, wood fiber, paper, cellulose fiber, wet-laid felt, and foam. In certain such embodiments, the base structure comprises one or more fillers, and one or more binders. For example, in certain embodiments as otherwise described herein, the mineral wool, fiberglass, gypsum, wood fiber, paper, cellulose fiber, wet-laid felt, and/or foam, and the one or more fillers and one or more binders are present in the base structure in a combined amount of at least 85 wt. %, or at least about 90 wt. %, or at least about 95 wt. %, or at least about 97.5%, or at least about 99 wt. %, or at least about 99.5 wt. %. In certain embodiments as otherwise described herein, the base structure comprises mineral wool. The person of ordinary skill in the art will appreciate that a number of fillers suitable for a base structure (e.g., a base structure comprising mineral wool) are known in the art. For example, in certain embodiments as otherwise described herein, the base structure comprises one or more fillers selected from dolomite, wollastonite, saw dust, fly ash, recycled plastic, rubber crumb, gypsum, glass, perlite, wood pulp (i.e., cellulose), recycled paper, and recycled glass. The person of ordinary skill in the art will further appreciate that a number of binders suitable for a base structure (e.g., a base structure comprising mineral wool) are known in the art. For example, in certain embodiments as otherwise described herein, the base structure comprises one or more binders selected from urea-formaldehyde resin, phenolic resin, polyurethane, polyacrylates, polystyrene, styrene-acrylate copolymers, styrene-butadiene copolymers (i.e., styrene-butadiene rubber, SBR), styrene-butadiene-styrene block copolymer (SBS), styrene-ethylene-butadiene-styrene block copolymer (SEBS), poly(vinyl acetate) (PVAc), poly(vinyl alcohol) (PVA), poly(ethylene-vinyl acetate) (EVA), ethylene-vinyl chloride copolymers, silicones, nylons, acetals, polyethylene oxide, acrylic resins, and starches, e.g., modified starches.

In certain embodiments as otherwise described herein, the outward major surface of the base structure comprises a localized pigment (e.g., provided by applying a pigment to the outward major surface of the base structure). In certain such embodiments, the color of the outward major surface is white.

In certain embodiments as otherwise described herein, the outward major surface of the base structure comprises a localized adhesive. However, the present inventors have determined that the acoustic panels as otherwise described herein can be prepared according to methods as otherwise described herein, without the use of a localized adhesive, which can be costly and can negatively affect the acoustic performance of the panel. Accordingly, in certain embodiments, an adhesive is not localized on the outward major surface of the base structure of the acoustic panel as otherwise described herein. In certain such embodiments, neither is a pigment localized on the outward major surface of the base structure.

In certain embodiments as otherwise described herein, the base structure does not comprise perforations. For example, in certain such embodiments, the base structure has one or more physical properties (e.g., porosity) that provide desirable acoustic properties.

In other embodiments, the base structure comprises a plurality of perforations extending from the outward major surface towards the inward major surface, the plurality of perforations occupying an area of the outward major surface. As used herein, the shape of a perforation at its opening may be elongated (e.g., may have an aspect ratio of 2, or 3, or 4, or 5, etc.), or may be annular (e.g., circular). In certain embodiments as otherwise described herein, the perforations have an average depth of less than about 4 mm. For example, in certain such embodiments, the perforations have an average depth within the range of about 2 mm to about 4 mm. In other embodiments, the perforations have an average depth of at least about 4 mm. For example, in certain such embodiments, the perforations have an average depth within the range of about 4 mm to about 12 mm. The person of ordinary skill in the art will appreciate that, in some aspects, perforations as used herein, having an elongated opening and an average depth of less than about 4 mm are also known in the art as "fissures."

Base structure 12 comprises a plurality of perforations 20 (shown in part in FIG. 1). In certain embodiments as otherwise described herein, the plurality of perforations occupies an area of the outward major surface that is within the range of about 0.1% to about 10% of the total area of the outward major surface of base structure 12. For example, in certain embodiments as otherwise described herein, the perforations occupy an area of the outward major surface within the range of about 0.1% to about 9%, or about 0.1% to about 8%, or about 0.1% to about 7%, or about 0.1% to about 6%, or about 0.1% to about 5%, or about 0.1% to about 4%, or about 0.25% to about 10%, or about 0.5% to about 10%, or about 0.75% to about 10%, or about 1% to about 10%, or about 1.5% to about 10%, or about 2% to about 10%, or about 2.5% to about 10%, or about 3% to about 10%, or about 4% to about 10%, or about 5% to about 10%, or about 6% to about 10%, or about 7% to about 10%, or about 0.25% to about 9%, or about 0.5% to about 8%, or about 0.75% to about 7%, or about 1% to about 6%, or about 1.5% to about 5% of the total area of the outward major surface.

In certain embodiments as otherwise described herein, the perforations have an average depth of at least about 4 mm, such as an average depth within the range of about 4 mm to about 12 mm, or about 5 mm to about 10 mm. In certain embodiments as otherwise described herein, the plurality of perforations are annular, and the perforations have an average diameter within the range of about 0.25 mm to about 5 mm. For example, in certain such embodiments, the average diameter of the perforations is within the range of about 0.25 mm to about 4.5 mm, or about 0.25 mm to about 4 mm, or about 0.25 mm to about 3.5 mm, or about 0.25 mm to about 3 mm, or about 0.25 mm to about 2.5 mm, or about 0.25 mm to about 2 mm, or about 0.25 mm to about 1.5 mm, or about 0.5 mm to about 5 mm, or about 0.75 mm to about 5 mm, or about 1 mm to about 5 mm, or about 1.25 mm to about 5 mm, or about 1.5 mm to about 5 mm, or about 2 mm to about 5 mm, or about 2.5 mm to about 5 mm, or about 3 mm to about 5 mm, or about 3.5 mm to about 5 mm, or about 0.5 mm to about 4 mm, or about 0.5 mm to about 3.5 mm, or about 0.5 mm to about 3 mm, or about 0.75 mm to about 2.5 mm, or about 1 mm to about 2.5 mm.

Base structure 12 has a thickness 22. In certain embodiments as otherwise described herein, the base structure has a thickness within the range of about 2 mm to about 50 mm. For example, in certain such embodiments, the thickness of the base structure is within the range of about 2 mm to about 45 mm, or about 2 mm to about 40 mm, or about 2 mm to about 35 mm, or about 2 mm to about 30 mm, or about 2 mm to about 25 mm, or about 2 mm to about 20 mm, or about 2 mm to about 17.5 mm, or about 2 mm to about 15 mm, or about 2 mm to about 10 mm, or about 3 mm to about 50 mm, or about 4 mm to about 50 mm, or about 5 mm to about 50 mm, or about 6 mm to about 50 mm, or about 7 mm to about 50 mm, or about 8 mm to about 50 mm, or about 9 mm to about 50 mm, or about 10 mm to about 50 mm, or about 12.5 mm to about 50 mm, or about 15 mm to about 50 mm, or about 17.5 mm to about 50 mm, or about 20 mm to about 50 mm, or about 3 mm to about 45 mm, or about 3 mm to about 40 mm, or about 4 mm to about 35 mm, or about 5 mm to about 30 mm, or about 5 mm to about 25 mm, or about 5 mm to about 20 mm.

In certain embodiments as otherwise described herein, a width of the acoustic panel is within the range of about 12 to about 60 inches, e.g., from 23 to 25 inches or from 46 to 50 inches, and a length of the acoustic panel is within the range of about 12 to about 144 inches, e.g., from 23 to 25 inches or from 46 to 50 inches.

The person of ordinary skill in the art will appreciate that base structure 12 will have certain acoustic properties. In some aspects, base structure 12 has a characteristic noise reduction coefficient (NRC) of at least about 0.3. In certain embodiments as otherwise described herein, the base structure has independently a noise reduction coefficient of at least about 0.5. For example, in certain embodiments as otherwise described herein, the base structure has independently a noise reduction coefficient of at least about 0.55, or at least about 0.6, or at least about 0.65, or at least about 0.7, or at least about 0.75, or at least about 0.8, or at least about 0.85, or at least about 0.9, or at least about 0.95.

Panel 10 further includes a coating layer 24 directly disposed on the outward major surface of the base structure, the coating layer having an exterior major surface 26 opposing the outward major surface of the base structure. The coating layer 24 is formed of an open-cell foam.

Coating layer 24 has, independently of the base structure, a characteristic sound absorption coefficient. As noted above, the coating layer of the acoustic panel as otherwise described herein has an absorption coefficient of less than 0.5 for acoustic frequencies in the range of 100 Hz to 10,000 Hz. In certain embodiments as otherwise described herein, the coating layer has an absorption coefficient of less than 0.45, or less than 0.4, or less than 0.35, or less than 0.3, or less than 0.25 for acoustic frequencies in the range of 100 Hz to 10,000 Hz. In another example, in certain embodiments as otherwise described herein, the coating layer and the base structure each independently have an air resistivity, and the air resistivity of the coating layer is equal to or less than the air resistivity of the base structure. In certain such embodiments, the air resistivity of the base structure is at least 25%, or at least 50%, or at least 75%, or at least about 100% greater than the air resistivity of the coating layer. In some embodiments, the air resistivity of the coating layer is in a range of about 1 to about 2000 kPa·s/m$^2$, or about 10 to about 1000 kPa·s/m$^2$, or about 100 to about 500 kPa·s/m$^2$.

Additionally, coating layer 24 has a characteristic light scattering percentage. As noted above, the coating layer of the acoustic panel as otherwise described herein is substantially scattering for light in the wavelength range of 380 nm to 780 nm. In certain embodiments as otherwise described herein, the coating layer is substantially scattering for light in the wavelength range of 380 nm to 780 nm. For example, in certain such embodiments, the coating layer has a light scattering percentage of at least about 50%, or at least about 55%, or at least about 60%, or at least about 65%, or at least about 70%, or at least about 75%, or at least about 80%, or at least about 85%, or at least about 90%, or at least about 95%, for a wavelength region of 380 nm to 780 nm.

The person of ordinary skill in the art will further appreciate that panel 10, comprising base structure 12 and coating layer 24, will have certain acoustic properties. In some aspects, panel 10 can have a characteristic noise reduction coefficient. In certain embodiments as otherwise described herein, the acoustic panel has a noise reduction coefficient of at least about 0.3. For example, in certain embodiments as otherwise described herein, the acoustic panel has a noise reduction coefficient of at least about 0.35, or at least about 0.4, or at least about 0.45. And in certain additional embodiments as otherwise described herein, the acoustic panel has a noise reduction coefficient of at least about 0.55, or at least about 0.6, or at least about 0.65, or at least about 0.7, or at least about 0.75, or at least about 0.8, or at least about 0.85, or at least about 0.9, or at least about 0.95. In certain embodiments as otherwise described herein, the noise reduction coefficient of the acoustic panel is at least about 70% of the noise reduction coefficient of the base structure independently. For example, in certain such embodiments, the noise reduction coefficient of the acoustic panel is at least about 75%, or at least about 80%, or at least about 85%, or at least about 90%, or at least about 95% of the noise reduction coefficient of the base structure independently.

Coating layer 24 has a thickness 28. In certain embodiments as otherwise described herein, the thickness of the coating layer is within the range of about 0.1 mm to about 10 mm. For example, in certain such embodiments, the thickness of the coating layer is within the range of about 0.1 mm to about 9 mm, or about 0.1 mm to about 8 mm, or about 0.1 mm to about 7 mm, or about 0.1 mm to about 6 mm, or about 0.1 mm to about 6 mm, or about 0.1 mm to about 5 mm, or about 0.1 mm to about 4 mm, or about 0.25 mm to about 10 mm, or about 0.25 mm to about 10 mm, or about 0.5 mm to about 10 mm, or about 0.75 mm to about 10 mm, or about 1 mm to about 10 mm, or about 1.5 mm to about 10 mm, or about 2 mm to about 10 mm, or about 3 mm to about 10 mm, or about 4 mm to about 10 mm, or about 5 mm to about 10 mm, or about 6 mm to about 10 mm, or about 0.25 mm to about 9 mm, or about 0.25 mm to about 8 mm, or about 0.25 mm to about 7 mm, or about 0.25 mm to about 6 mm, or about 0.5 mm to about 5 mm, or about 0.5 mm to about 4 mm.

As noted above, coating layer 24 is formed of an open-cell foam. In certain aspects, the open-cell foam comprises a porous structure. For example, in certain embodiments as otherwise described herein, the coating layer has an average cell diameter within the range of about 10 μm to about 500 μm. In certain such embodiments, the coating layer has an average cell diameter within the range of about 10 μm to about 450 μm, or about 10 μm to about 400 μm, or about 10 μm to about 350 μm, or about 10 μm to about 300 μm, or about 10 μm to about 250 μm, or about 10 μm to about 200 μm, or about 25 μm to about 500 μm, or about 50 μm to about 500 μm, or about 75 μm to about 500 μm, or about 100 μm to about 500 μm, or about 150 μm to about 500 μm, or about 200 μm to about 500 μm, or about 250 μm to about 500 μm, or about 300 μm to about 500 μm, or about 25 μm to about 450 μm, or about 50 μm to about 400 μm, or about 75 μm to about 350 μm, or about 100 μm to about 300 μm.

In certain embodiments as otherwise described herein, the coating layer has a density within the range of about 0.01 g/cm$^3$ to about 0.5 g/cm$^3$, or about 0.01 g/cm$^3$ to about 0.35 g/cm$^3$, or about 0.01 g/cm$^3$ to about 0.25 g/cm$^3$, or about 0.01 g/cm$^3$ to about 0.15 g/cm$^3$, or about 0.05 g/cm$^3$ to about 0.5 g/cm$^3$, or about 0.1 g/cm$^3$ to about 0.5 g/cm$^3$, or about 0.2 g/cm$^3$ to about 0.5 g/cm$^3$, or about 0.05 g/cm$^3$ to about 0.35 g/cm$^3$, or about 0.05 g/cm$^3$ to about 0.25 g/cm$^3$, or about 0.1 g/cm$^3$ to about 0.2 g/cm$^3$.

In certain embodiments as otherwise described herein, the coating layer comprises one or more foamable polymers (e.g., one or more of a rubber polymer and a plastic polymer), and one or more of a dispersant, a coalescing aid, and a foaming surfactant, present in the layer in a combined amount of at least about 30 wt. %. For example, in certain embodiments as otherwise described herein, the one or more foamable polymers, and the one or more of a dispersant, a coalescing aid, and a foaming surfactant are present in the layer in a combined amount of at least about 35 wt. %, or at least about 40 wt. %, or at least about 45 wt. %, or at least about 50 wt. %, or at least about 55 wt. %, or at least about 60 wt. %, or at least about 65 wt. %, or at least about 70 wt. %, or at least about 75 wt. %, or at least about 80 wt. %.

A foamable polymer can be used to provide the foamed structure of the coating layer. A variety of polymers can be used, such as rubber polymers and plastic polymers. In certain embodiments as otherwise described herein, the coating layer comprises a rubber polymer. For example, in certain such embodiments, the rubber polymer of the coating layer is a styrene butadiene copolymer (e.g., styrene-butadiene rubber (SBR) and styrene-butadiene-styrene block copolymer (SBS)). In certain embodiments as otherwise described herein, the coating layer comprises a plastic polymer. For example, in certain embodiments, the plastic polymer of the coating layer is a polyacrylate such as poly(methyl methacrylate), poly(ethyl acrylate), poly(butyl acrylate), poly(acrylic acid), polystyrene, poly vinyl acetate or poly vinyl alcohol. Other polymers for use as foamable polymers include polyurethanes, polyacrylates, styrene-acrylate copolymers, styrene-ethylene-butadiene-styrene block copolymer (SEBS), poly(vinyl acetate) (PVAc), poly(ethylene-vinyl acetate) (EVA), ethylene-vinyl chloride copolymers. In many embodiments, the foamable polymer can be provided as a latex (e.g., latex rubbers or acrylic latexes), having a solids content, e.g., of 30-70 wt % or 40-60 wt %, and an average particle size, e.g., of 50-500 nm. Examples include Rhoplex SG30 from Dow, Avicor 384 from Celanese, Sunbond 3410 from Omnova, and Acronol Edge 4750 from BASF. The acrylic latex emulsions are often a copolymer mixture of polymethyl methacrylate, polybutyl acrylate, and polyethyl acrylate with other additives. In certain embodiments, the polymer of the latex has a glass transition temperature below 70° C. A combination of polymers can be used in order to provide the liquid composition used to form the coating with a desired rheology, e.g., acrylic latex together with an acrylic polymer. An example of a polymer that can be used to modify coating rheology is ACRYSOL™ ASE-60, an acid containing, acrylic emulsion copolymer available from Dow.

The person of ordinary skill in the art will appreciate that a number of dispersants suitable for the coating layer, such as amphiphilic and/or ionic compounds, are known in the art. In certain embodiments as otherwise described herein, the coating layer comprises a coalescing aid. The person of ordinary skill in the art will appreciate that a number of coalescing aids suitable for the coating layer are known in the art. For example, in certain such embodiments, the coalescing aid is selected from texanol (i.e., 2,2,4-trimethyl-1,3-pentanediol monoisobutyrate), ethylene glycol phenyl ether, butyl cellosolve, butyl carbitol, benzoic acid isononyl ester, and organic solvent. In certain embodiments as otherwise described herein, the coating layer comprises a foaming surfactant. The person of ordinary skill in the art will appreciate that a number of foaming surfactants suitable for the coating layer are known in the art. For example, in certain such embodiments, the foaming surfactant is selected from triton X-100, sodium lauryl ether sulfate, sodium lauryl sulfate, ammonium lauryl sulfate, sodium pareth sulfate, diethanolamine, oleic acid, cetyl betaine, sodium olefin sulfonate, ammonium stearate, sodium and ammonium sulfosuccinamides and sodium and ammonium sulfosuccinates.

In certain embodiments as otherwise described herein, the coating layer further comprises a filler. For example, in certain such embodiments, the filler is calcium carbonate. The person of ordinary skill in the art will appreciate that a number of fillers suitable for the coating layer, such as silica, alumina, aluminum trihydrate, titanium oxide, zinc oxide, magnesium oxide, barium sulfate, clay, mica, talc, kaolin, nepheline syenite, perlite, and glass. In certain embodiments as otherwise described herein, the filler is present in the coating layer in an amount within the range of about 1 wt. % to about 60 wt. %. For example, in certain such embodiments, the filler is present in the coating layer in an amount within the range of about 1 wt. % to about 55 wt. %, or about 1 wt. % to about 50 wt. %, or about 1 wt. % to about 45 wt. %, or about 1 wt. % to about 40 wt. %, or about 1 wt. % to about 35 wt. %, or about 1 wt. % to about 30 wt. %, or about 5 wt. % to about 60 wt. %, or about 10 wt. % to about 60 wt. %, or about 15 wt. % to about 60 wt. %, or about 20 wt. % to about 60 wt. %, or about 25 wt. % to about 60 wt. %, or about 30 wt. % to about 60 wt. %, or about 5 wt. % to about 55 wt. %, or about 10 wt. % to about 55 wt. %, or about 15 wt. % to about 50 wt. %, or about 20 wt. % to about 50 wt. %.

In certain embodiments as otherwise described herein, the coating layer further comprises a pigment. For example, in certain such embodiments, the pigment is titanium dioxide, zinc oxide, or carbon black. Other common pigments suitable in the sprayable mixture include, for example, transition metal and metal oxide pigments (e.g., iron oxides), anthraquinoids, quinacridone, phthalocyanines, ultramarines, nepheline syenite, barium sulfate, aluminum trihydrate, and magnesium oxide. In certain embodiments as otherwise described herein, the filler is present in the coating layer in an amount within the range of about 0.5 wt. % to about 20 wt. %. For example, in certain such embodiments, the filler is present in the coating layer in an amount within the range of about 0.5 wt. % to about 17.5 wt. %, or about 0.5 wt. % to about 15 wt. %, or about 0.5 wt. % to about 12.5 wt. %, or about 0.5 wt. % to about 10 wt. %, or about 0.5 wt. % to about 7.5 wt. %, or about 0.5 wt. % to about 5 wt. %, or about 1 wt. % to about 20 wt. %, or about 1.5 wt. % to about 20 wt. %, or about 2 wt. % to about 20 wt. %, or about 2.5 wt. % to about 20 wt. %, or about 5 wt. % to about 20 wt. %, or about 7.5 wt. % to about 20 wt. %, or about 10 wt. % to about 20 wt. %, or about 12.5 wt. % to about 20 wt. %, or about 15 wt. % to about 20 wt. %, or about 1 wt. % to about 17.5 wt. %, or about 2.5 wt. % to about 15 wt. %, or about 5 wt. % to about 12.5 wt. %.

A variety of other components can be present in the coating layer. For example, in certain embodiments, and depending on the particular foamable polymer used, a crosslinking agent (or, a reaction product thereof with the foamable polymer) is present in the coating layer, e.g., in an amount in the range of 0.1 wt % to 15 wt %. A variety of crosslinking agents can be used, e.g., carbodiimide (such as Carbodilite XV-02 from Nisshinbo Chemical), sulfur, zinc oxide, zinc dithiocarbamate, mercaptobenzothiazole, ammonium zirconium carbonate, potassium zirconium carbonate and melamine-formaldehyde resin. The person of ordinary skill in the art will select an appropriate crosslinking agent depending on the other components of the coating layer.

For example, in certain embodiments as otherwise described herein, the coating layer formed of an open-cell foam comprises an acrylic polymer, styrene butadiene polymer, or a mixture thereof, present in the coating layer in an amount within the range of about 20 wt. % to about 80 wt. % (e.g., about 25 wt. % to about 70 wt. %, or about 30 wt. % to about 60 wt. %). In certain such embodiments, the coating layer further comprises a dispersant, present in the coating layer in an amount within the range of about 0.1 wt. % to about 10 wt. % (e.g., about 0.5 wt. % to about 8 wt. %). In certain such embodiments, the coating layer further comprises a coalescing aid, present in the coating layer in an amount within the range of about 0.1 wt. % to about 10 wt. % (e.g., about 0.5 wt. % to about 8 wt. %). In certain such embodiments, the coating layer further comprises a foaming surfactant, present in the coating layer in an amount within the range of about 0.25 wt. % to about 25 wt. % (e.g., about 0.25 wt % to about 15 wt %, or about 1 wt. % to about 12 wt. %). In certain such embodiments, the coating layer further comprises a filler (e.g., calcium chloride), present in the foam in an amount within the range of about 1 wt. % to about 60 wt. % (e.g., about 15 wt. % to about 45 wt. %). In certain such embodiments, the coating layer further comprises a pigment, present in the foam in an amount within the range of about 0.5 wt. % to about 20 wt. % (e.g., about 2.5 wt. % to about 15 wt. %).

In certain embodiments, as otherwise described herein, the coating layer comprises a plurality of particles (e.g., as a filler and/or as a pigment). For example, in certain such embodiments, the coating layer comprises particles selected from rubber, plastic, glass, metal, ceramic, or mineral. In certain embodiments as otherwise described herein, the particles are glass fibers, plastic fibers such as polyester, polypropylene, polyethylene, polyethylene terephthalate, polyvinyl chloride, and polyamide fibers, and mineral fibers. In certain embodiments as otherwise described herein, the plurality of particles has an average particle size within the range of about 1 nm to about 200 nm (e.g., wollastonite particles having a size of about 8 nm) In certain embodiments as otherwise described herein, the plurality of particles has an average particle size (i.e., the major dimension of a particle, or the length of a fiber) within the range of about 1 µm to about 50 µm. For example, in certain such embodiments, the plurality of particles has an average particle size within the range of about 1 µm to about 40 µm, or about 1 µm to about 30 µm, or about 1 µm to about 20 µm, or about 5 µm to about 50 µm, or about 10 µm to about 50 µm, or about 20 µm to about 50 µm, or about 30 µm to about 50 µm, or about 5 µm to about 40 µm, or about 5 µm to about 30 µm. In other embodiments as otherwise described herein, the plurality of particles has an average particle size within the range of about 0.1 mm to about 10 mm. For example, in certain such embodiments, the plurality of particles has an average particle size within the range of about 0.1 mm to about 8 mm, or about 0.1 mm to about 6 mm, or about 0.1 mm to about 4 mm, or about 0.5 mm to about 10 mm, or about 1 mm to about 10 mm, or about 2 mm to about 10 mm, or about 4 mm to about 10 mm, or about 0.5 mm to about 8 mm, or about 0.5 mm to about 6 mm.

In certain embodiments as otherwise described herein, the total amount of the foamable polymer (e.g., rubber polymer and/or plastic polymer), dispersant, coalescing aid, foaming surfactant, filler, pigment, and crosslinking agent is at least about 85 wt. % of the coating layer. For example, in certain such embodiments, the total amount of the foamable polymer (e.g., rubber polymer and/or plastic polymer), dispersant, coalescing aid, foaming surfactant, filler, pigment, and crosslinking agent is at least about 90 wt. %, or at least about 95 wt. %, or at least about 97.5 wt. %, or at least about 99 wt. %, or at least about 99.5 wt. % of the coating layer.

In certain embodiments as otherwise described herein, the exterior major surface of the coating layer comprises a localized pigment (e.g., provided by applying a pigment to the exterior major surface of the coating layer). In certain such embodiments, the color of the exterior major surface is white.

In certain embodiments, the exterior major surface of the coating layer is rough. For example, in certain such embodiments, the exterior major surface of the coating layer has a gloss of less than about 20 gloss units (GU) for gloss angles in the range of 20-85 degrees. For example, in certain embodiments as otherwise described herein, the exterior major surface of the coating layer has a gloss of less than about 17.5 GU, or less than 15 GU, or less than about 12.5 GU, or less than about 10 GU for gloss angles in the range of 20-85 degrees. In certain desirable embodiments, the exterior major surface of the coating layer has a gloss of less than 7 GU, e.g., less than 5 GU or even less than 3 GU for gloss angles in the range of 20-85 degrees.

In certain embodiments as otherwise described herein, the panel is resistant to sagging.

Another aspect of the disclosure is a method of preparing an acoustic panel. The disclosure demonstrates such methods to efficiently provide relatively inexpensive and lightweight acoustic panels having a coating layer that is transparent to sound and obscuring of a perforated base structure. The method comprises providing a base structure having one or more edges, an outward major surface having a total area, and an inward major surface opposing the outward major surface. The base structure has independently a noise reduction coefficient (NRC) of at least about 0.3. The method includes coating, directly onto the outward major surface, a frothed composition comprising an aqueous suspension of foamable polymer (e.g., one or more of a rubber polymer and a plastic polymer), and one or more of a dispersant, a coalescing aid, and a foaming surfactant, present in the composition in a combined amount of at least about 50%. The method includes drying the coated frothed composition to provide a coating layer formed of an open-cell foam, the coating layer having an exterior major surface opposing the outward major surface of the base structure. The inventors have determined that the method provides a relatively lightweight coating layer without requiring separate coating layer formation and lamination steps. The amounts and identities of the various components of the base structure, including perforations, can be as otherwise described above with respect to the acoustic panels of the disclosure.

In certain embodiments as otherwise described herein, the frothed composition has a density within the range of about 0.01 g/cm$^3$ to about 0.5 g/cm$^3$, or about 0.01 g/cm$^3$ to about 0.35 g/cm$^3$, or about 0.01 g/cm$^3$ to about 0.25 g/cm$^3$, or about 0.01 g/cm$^3$ to about 0.15 g/cm$^3$, or about 0.05 g/cm$^3$ to about 0.5 g/cm$^3$, or about 0.1 g/cm$^3$ to about 0.5 g/cm$^3$, or about 0.2 g/cm$^3$ to about 0.5 g/cm$^3$, or about 0.05 g/cm$^3$ to about 0.35 g/cm$^3$, or about 0.05 g/cm$^3$ to about 0.25 g/cm$^3$, or about 0.1 g/cm$^3$ to about 0.2 g/cm$^3$.

In certain embodiments as otherwise described herein, the frothed composition comprises a rubber polymer. For example, in certain such embodiments, the rubber polymer is a styrene butadiene copolymer. In certain embodiments as otherwise described herein, the frothed composition comprises a plastic polymer. For example, in certain such embodiments, the plastic polymer is an polyacrylate such as poly(methyl methacrylate), poly(ethyl acrylate), poly(butyl acrylate), poly(acrylic acid), polystyrene, poly vinyl acetate or poly vinyl alcohol. Other polymers for use as foamable polymers include polyurethanes, polyacrylates, styrene-acrylate copolymers, styrene-ethylene-butadiene-styrene block copolymer (SEBS), poly(vinyl acetate) (PVAc), poly(ethylene-vinyl acetate) (EVA), ethylene-vinyl chloride copolymers. In many embodiments, the foamable polymer can be provided as a latex (e.g., latex rubbers or acrylic latexes), having a solids content, e.g., of 30-70 wt % or 40-60 wt %, and an average particle size, e.g., of 50-500 nm. Examples include Rhoplex SG30 from Dow, Avicor 384 from Celanese, Sunbond 3410 from Omnova, and Acronol Edge 4750 from BASF. The acrylic latex emulsions are often a copolymer mixture of polymethyl methacrylate, polybutyl acrylate, and polyethyl acrylate with other additives. In certain embodiments, the polymer of the latex has a glass transition temperature below 70° C. A combination of polymers can be used in order to provide the liquid composition used to form the coating with a desired rheology, e.g., acrylic latex together with an acrylic polymer. An example of a polymer that can be used to modify coating rheology is ACRYSOL™ ASE-60, an acid containing, acrylic emulsion copolymer available from Dow.

In certain embodiments as otherwise described herein, the frothed composition comprises a dispersant. The person of ordinary skill in the art will appreciate that a number of dispersants suitable for the frothed composition, such as amphiphilic and/or ionic compounds, are known in the art. In certain embodiments as otherwise described herein, the frothed composition comprises a coalescing aid. The person of ordinary skill in the art will appreciate that a number of coalescing aids suitable for the frothed composition are known in the art. For example, in certain such embodiments, the coalescing aid is selected from texanol (i.e., 2,2,4-trimethyl-1,3-pentanediol monoisobutyrate), ethylene glycol phenyl ether, butyl cellosolve, butyl carbitol, benzoic acid isononyl ester, and organic solvent. In certain embodiments as otherwise described herein, the frothed composition comprises a foaming surfactant. The person of ordinary skill in the art will appreciate that a number of foaming surfactants suitable for the frothed composition are known in the art. For example, in certain such embodiments, the foaming surfactant is selected from triton X-100, sodium lauryl ether sulfate, sodium lauryl sulfate, ammonium lauryl sulfate, and sodium pareth sulfate, ammonium stearate, sodium and ammonium sulfosuccinamides and sodium and ammonium sulfosuccinates.

In certain embodiments as otherwise described herein, the frothed composition further comprises a filler. For example, in certain such embodiments, the filler is calcium carbonate. The person of ordinary skill in the art will appreciate that a number of fillers suitable for the frothed composition, such as silica, alumina, aluminum trihydrate, titanium oxide, zinc oxide, magnesium oxide, barium sulfate, clay, mica, talc, kaolin, nepheline syenite, perlite, and glass. In certain embodiments as otherwise described herein, the filler is present in the frothed composition in an amount within the range of about 5 wt. % to about 50 wt. %. For example, in certain such embodiments, the filler is present in the frothed composition in an amount within the range of about 5 wt. % to about 45 wt. %, or about 5 wt. % to about 40 wt. %, or about 5 wt. % to about 35 wt. %, or about 5 wt. % to about 30 wt. %, or about 5 wt. % to about 25 wt. %, or about 10 wt. % to about 50 wt. %, or about 15 wt. % to about 50 wt. %, or about 20 wt. % to about 50 wt. %, or about 25 wt. % to about 50 wt. %, or about 30 wt. % to about 50 wt. %, or about 10 wt. % to about 45 wt. %, or about 10 wt. % to about 40 wt. %, or about 15 wt. % to about 35 wt. %, or about 15 wt. % to about 30 wt. %.

In certain embodiments as otherwise described herein, the frothed composition further comprises a pigment. For example, in certain such embodiments, the pigment is titanium dioxide, zinc oxide, or carbon black. Other common pigments suitable in the sprayable mixture include, for example, transition metal and metal oxide pigments (e.g., iron oxides), anthraquinoids, quinacridone, phthalocyanines, ultramarines, nepheline syenite, barium sulfate, aluminum trihydrate, and magnesium oxide. In certain embodiments as otherwise described herein, the pigment is present in the frothed composition in an amount within the range of about 0.5 wt. % to about 20 wt. %. For example, in certain such embodiments, the pigment is present in the frothed composition in an amount within the range of about 0.5 wt. % to about 17.5 wt. %, or about 0.5 wt. % to about 15 wt. %, or about 0.5 wt. % to about 12.5 wt. %, or about 0.5 wt. % to about 10 wt. %, or about 0.5 wt. % to about 7.5 wt. %, or about 0.5 wt. % to about 5 wt. %, or about 1 wt. % to about 20 wt. %, or about 1.5 wt. % to about 20 wt. %, or about 2 wt. % to about 20 wt. %, or about 2.5 wt. % to about 20 wt. %, or about 5 wt. % to about 20 wt. %, or about 7.5 wt. % to about 20 wt. %, or about 10 wt. % to about 20 wt. %, or about 12.5 wt. % to about 20 wt. %, or about 15 wt. % to about 20 wt. %, or about 1 wt. % to about 17.5 wt. %, or about 2.5 wt. % to about 15 wt. %, or about 5 wt. % to about 12.5 wt. %.

The frothed composition can further include a crosslinker, as described above with respect to the coating layer. For example, in certain embodiments, and depending on the particular foamable polymer used, a crosslinking agent (or, a reaction product thereof with the foamable polymer) is present in the coating layer, e.g., in an amount in the range of 0.1 wt % to 15 wt %. A variety of crosslinking agents can be used, e.g., carbodiimide (such as Carbodilite XV-02 from Nisshinbo Chemical), sulfur, zinc oxide, zinc dithiocarbamate, mercaptobenzothiazole, ammonium zirconium carbonate, potassium zirconium carbonate and melamine-formaldehyde resin. The person of ordinary skill in the art will select an appropriate crosslinking agent depending on the other components of the formulation.

In certain embodiments as otherwise described herein, the frothed composition comprises a plurality of particles (e.g., as filler and/or pigment). For example, in certain such embodiments, the frothed composition comprises particles selected from rubber, plastic, glass, metal, ceramic, or mineral. In certain embodiments as otherwise described herein, the plurality of particles has an average particle size within the range of about 1 μm to about 50 μm. For example, in certain such embodiments, the plurality of particles has an average particle size within the range of about 1 μm to about 40 μm, or about 1 μm to about 30 μm, or about 1 μm to about 20 μm, or about 5 μm to about 50 μm, or about 10 μm to about 50 μm, or about 20 μm to about 50 μm, or about 30 μm to about 50 μm, or about 5 μm to about 40 μm, or about 5 μm to about 30 μm. In other embodiments as otherwise described herein, the plurality of particles has an average particle size within the range of about 0.1 mm to about 10 mm. For example, in certain such embodiments, the plurality of particles has an average particle size within the range of about 0.1 mm to about 8 mm, or about 0.1 mm to about 6 mm, or about 0.1 mm to about 4 mm, or about 0.5 mm to about 10 mm, or about 1 mm to about 10 mm, or about 2 mm to about 10 mm, or about 4 mm to about 10 mm, or about 0.5 mm to about 8 mm, or about 0.5 mm to about 6 mm.

In certain embodiments as otherwise described herein, the total amount of the aqueous suspension (e.g., of one or more of a rubber polymer and a plastic polymer), dispersant, coalescing aid, foaming surfactant, filler, pigment, and crosslinking agent is at least about 85 wt. % of the frothed composition. For example, in certain such embodiments, the total amount of the aqueous suspension (e.g., of one or more of a rubber polymer and a plastic polymer), dispersant, coalescing aid, foaming surfactant, filler, pigment, and crosslinking agent is at least about 90 wt. %, or at least about 95 wt. %, or at least about 97.5 wt. %, or at least about 99 wt. %, or at least about 99.5 wt. % of the frothed composition.

As described above, one aspect of the disclosure is a method for preparing an acoustic panel comprising coating, directly onto the outward major surface of a base structure, a frothed composition, drying the coated frothed composition, and curing the coated frothed composition.

The present inventors have determined that the coating layers as otherwise described herein, substantially scattering for light in the wavelength range 380-780 nm, is advantageously obscuring of the physical features of an underlying acoustic panel. The present inventors have further determined that, in certain embodiments as otherwise described herein, inclusion of a pigment in the frothed composition as otherwise described herein provides coating layers having a desired color, and accordingly neither the outward major surface of the base structure of the base structure nor the exterior major surface of the coating layer.

In certain embodiments as otherwise described herein, the thickness of the coated frothed composition before drying is within the range of about 0.25 mm to about 25 mm. For example, in certain such embodiments, the thickness of the coated frothed composition before drying is within the range of about 0.25 mm to about 22.5 mm, or about 0.25 mm to about 20 mm, or about 0.25 mm to about 17.5 mm, or about 0.25 mm to about 15 mm, or about 0.25 mm to about 12.5 mm, or about 0.25 mm to about 10 mm, or about 0.25 mm to about 7.5 mm, or about 0.5 mm to about 25 mm, or about 1 mm to about 25 mm, or about 1.5 mm to about 25 mm, or about 2 mm to about 25 mm, or about 2.5 mm to about 25 mm, or about 5 mm to about 25 mm, or about 7.5 mm to about 25 mm, or about 10 mm to about 25 mm, or about 12.5 mm to about 25 mm, or about 15 mm to about 25 mm, or about 0.5 mm to about 20 mm, or about 0.5 mm to about 15 mm, or about 1 mm to about 12.5 mm, or about 1 mm to about 10 mm.

The person of ordinary skill in the art will appreciate that the frothed composition can be coated directly onto the outward major surface of the base structure using any of a variety of a coating means known in the art. For example, in certain embodiments as otherwise described herein, coating the frothed composition comprises coating the composition directly onto the outward major surface of the base structure with a knife coater, roll coater, or a spray coater.

In certain embodiments as otherwise described herein, the coated frothed composition is dried at a temperature within the range of about 50° C. to about 350° C. For example, in certain such embodiments, the coated frothed composition is dried at a temperature within the range of about 50° C. to about 300° C., or about 50° C. to about 250° C., or about 50° C. to about 200° C., or about 75° C. to about 350° C., or about 100° C. to about 350° C., or about 150° C. to about 350° C., or about 200° C. to about 350° C., or about 75° C. to about 300° C., or about 100° C. to about 250° C. A variety of apparatuses and methods can be used in the drying, e.g., an infrared oven, or an oven without airflow.

In certain embodiments as otherwise described herein, the method further comprises roughening the exterior major surface of the coating layer after drying the coated frothed composition. In certain embodiments of the methods as otherwise described herein, an exterior major surface having a matte appearance can be provided by roughening the exterior major surface of the coating layer after drying the coated frothed composition by, for example, treating the exterior major surface with a solvent, or sanding the exterior major surface.

Notably, the methods described herein can be performed to provide acoustic panels particularly useful, for example, as acoustic ceiling tiles. Accordingly, another aspect of the disclosure is a ceiling system comprising a plurality of the acoustic panels described herein, or acoustic panels prepared according to a method described herein. In certain embodiments, each panel of the plurality is oriented such that the exterior major surface of the coating layer is facing downwards. The person of ordinary skill in the art will appreciate that the perforations of the base structures of each panel will, in such an arrangement, be advantageously obscured by the coating layer while still being accessible to air and sound waves.

EXAMPLES

The Examples that follow are illustrative of specific embodiments of the invention, and various uses thereof. They are set forth for explanatory purposes only, and are not to be taken as limiting the invention.

Example 1. Panel Preparation

A foamable mixture (Formulation 1) was prepared according to Table 1, below.

TABLE 1

Foamable Mixture Composition

| Component | Amount (wet wt. %) |
|---|---|
| Acrylic latex suspension (aqueous) | 62 |
| polycarboxylate sodium salt dispersant | 3 |
| texanol coalescing aid | 3 |
| sulphosuccinamine, sodium salt surfactant (aqueous) | 5 |
| CaCO$_3$ | 20 |
| TiO$_2$ | 8 |

The mixture was frothed using a wire whisk mixer for 6 minutes at 360 rpm, and then for 15 minutes at 100 rpm, to provide a foam density of about 0.3 g/cm$^3$. The foam was applied with a knife coater onto a ⅝-inch mineral wool base structure having a 3% total coverage of 1.4-mm perforations, and then dried at 200° C. for 2 minutes to provide a coating layer having a thickness of 1-2 mm.

Example 2. Foam Generation

Formulation 1 above was prepared using a continuous foam generator with gas injection and a 2-inch rotor-stator mixer. The foam was produced with a rotor speed of approximately 1200 RPM with fluid pressure of 40 PSI and gas back pressure of 60 PSI. The foam produced was similar in structure to the lab mixer results from Example 1 but with more uniform cell size.

Formulation 1 was prepared as described in Example 1 above but instead of knife coating, the liquid foam was coated onto ceiling boards using a reverse roll coater with substrate speed of 3.5 m/min, applicator roll at 3.0 m/min in the reverse direction and metering roll at 1 m/min in the forward direction. The foam coating had a coating thickness between 1 and 2 mm and had properties similar to the coating described above for knife coating.

Formulation 1 was prepared as described in Example 1 above but instead of drying in a standard convection oven, was dried using a dryer which did not have any forced air convection and heated the sample only with infrared radiation. The surface of the foam coating was heated for 2 minutes and the surface temperature achieved at least 150° C. The dried coating produced was similar in properties to those described in Example 1.

Formulation 1 above was prepared using a continuous foam generator with gas injection and a 2-inch rotor-stator mixer. The foam was produced with a rotor speed of approximately 1200 RPM with fluid pressure of 40 PSI and gas back pressure of 60 PSI. The foam produced was similar in structure to the lab mixer results from Example 1 but with more uniform cell size.

Example 3. Acoustic Performance

Figure 2:
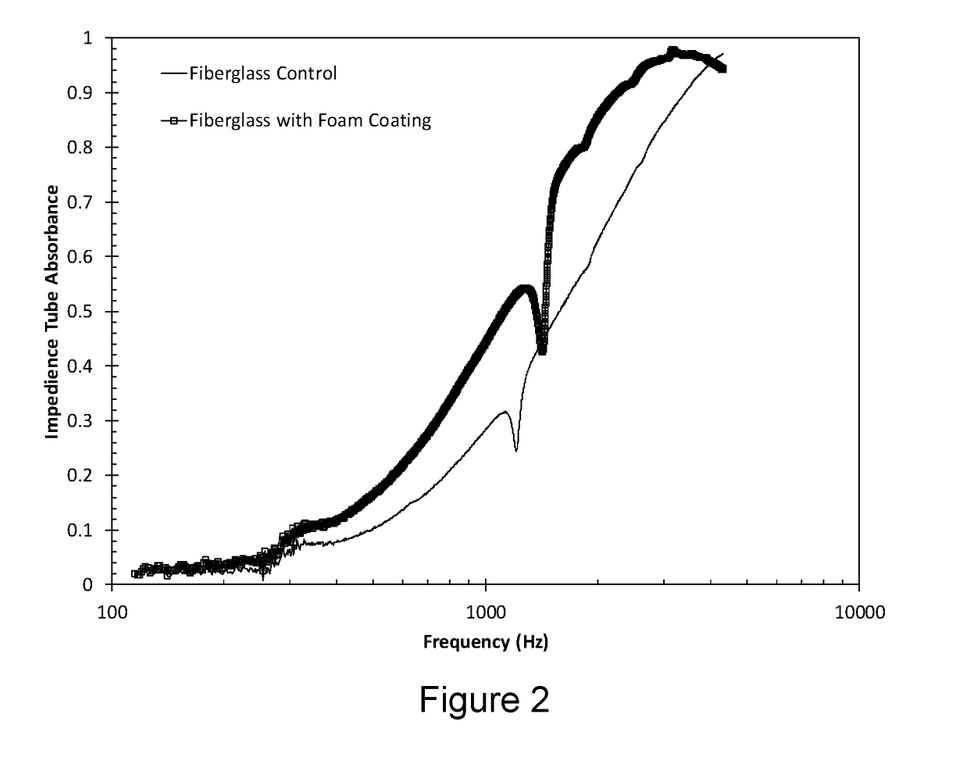
FIG. 2 is a graph of impedance tube measurements of an uncoated fiberglass substrate and of a coated fiberglass substrate following the procedure of ASTM C384.

A layer of foam of Formulation 2 was coated on a fiberglass substrate. Impedance tube measurements were taken of an uncoated fiberglass substrate and of a coated fiberglass substrate following the procedure of ASTM C384. The data are provided in FIG. 2, and demonstrate that the acoustic absorption increases with the coating added. For example, at 1000 Hz, the absorbance increases from 0.27 without foam coating to 0.43 with foam coating—a relative change of 0.16.

Example 4. Additional Formulations

Additional formulations were prepared as described in Tables 2-3 below. Formulation 2 provided a foam with uniform aesthetic, although it was less durable. Formulation 3 provided an acceptable foam.

TABLE 2

Formulation 2

| Component | Wet wt % |
|---|---|
| Acrylic latex emulsion | 68.6% |
| Water | 8.2% |
| Acrylic polymer as rheology modifier | 1.9% |
| Sulphosuccinamide, sodium salt aqueous solution as surfactant | 12.0% |
| TiO$_2$ | 9.3% |

TABLE 3

Formulation 3

| Component | Wet wt % |
|---|---|
| Acrylic latex emulsion | 59.3% |
| Carbodiimide as crosslinker | 2.5% |
| Water soluble polycarboxylate as dispersant | 2.5% |
| Texanol as coalescant | 3.0% |
| Sulphosuccinamide, sodium salt aqueous solution as surfactant | 4.7% |
| Calcium carbonate | 20.1% |
| TiO$_2$ | 8.0% |

Additional aspects of the disclosure are provided by the following enumerated embodiments, which can be combined in any number or in any combination that is not technically or logically inconsistent.

Embodiment 1. An acoustic panel comprising
    a base structure having one or more edges, an outward major surface having a total area, and an inward major surface opposing the outward major surface, the base structure having independently a noise reduction coefficient of at least about 0.3; and
    a coating layer directly disposed on the outward major surface of the base structure, the coating layer being formed of an open-cell foam, the coating layer having an exterior major surface opposing the outward major surface of the base structure,
    wherein the coating layer is substantially scattering for light in the wavelength range 380-780 nm, and has an absorption coefficient of less than 0.5 for acoustic frequencies in the range of 100 Hz to 10,000 Hz.

Embodiment 2. A panel according to embodiment 1, wherein the base structure comprises
  one or more of mineral wool, fiberglass, gypsum, wood fiber, paper, cellulose fiber, wet-laid felt, and foam;
  one or more fillers; and
  one or more binders;
  present in the base structure in a combined amount of at least about 85 wt. %, or at least about 95 wt. %, or at least about 97.5 wt. %, or at least about 99 wt. %.

Embodiment 3. A panel according to embodiment 2, wherein the base structure comprises mineral wool.

Embodiment 4. A panel according to any of embodiments 1-3, wherein the base structure comprises a plurality of perforations extending from the outward major surface towards the inward major surface, the plurality of perforations occupying an area of the outward major surface within the range of about 0.1% to about 10% of the total area of the outward major surface Embodiment 5. A panel according to embodiment 4, wherein the perforations occupy an area of the outward major surface within the range of about 0.5% to about 10%, e.g., about 0.5% to about 8%, or about 1% to about 6%.

Embodiment 6. A panel according to embodiment 4 or 5, wherein the perforations are annular, and the average diameter of the perforations is within the range of about 0.25 mm to about 5 mm, e.g., about 0.25 mm to about 4 mm, or about 0.5 mm to about 3 mm.

Embodiment 7. A panel according to any of embodiments 4-6, wherein the average depth of the perforations is at least about 3 mm, e.g., at least about 4 mm, or at least about 5 mm.

Embodiment 8. A panel according to any of embodiments 1-7, wherein the base structure has a thickness within the range of about 2 mm to about 50 mm, e.g., about 2 mm to about 35 mm, or about 5 mm to about 25 mm.

Embodiment 9. A panel according to any of embodiments 1-8, wherein a width of the panel is within the range of about 12 to about 60 inches, e.g., from 23 to 25 inches or from 46 to 50 inches, and a length of the acoustic panel is within the range of about 12 to about 144 inches, e.g., from 23 to 25 inches or from 46 to 50 inches.

Embodiment 10. A panel according to any of embodiments 1-9, wherein the base structure has independently a noise reduction coefficient (NRC) of at least about 0.5, e.g., at least about 0.6, or at least about 0.7, or at least about 0.8.

Embodiment 11. A panel according to any of embodiments 1-10, wherein the base structure and the coating layer each independently have an air resistivity, and the air resistivity of the coating layer is equal to or less than the air resistivity of the base structure.

Embodiment 12. A panel according to embodiment 11, wherein the air resistivity of the coating layer is in a range of about 1 to about 2000 kPa·s/m$^2$, or about 10 to about 1000 kPa·s/m$^2$, or about 100 to about 500 kPa·s/m$^2$.

Embodiment 13. A panel according to any of embodiments 1-12, wherein the coating layer has a light scattering percentage of at least about 50% (e.g., at least about 60%, or at least about 70%, or at least about 80%) for light in the wavelength region 380-780 nm.

Embodiment 14. A panel according to any of embodiments 1-13, having an NRC of at least about 0.3 (e.g., at least about 0.35, or at least about 0.4, or at least about 0.45), or at least about 0.5 (e.g., at least about 0.6, or at least about 0.7, or at least about 0.8).

Embodiment 15. A panel according to any of embodiments 1-14, wherein the NRC of the panel is at least about 70% (e.g., at least about 80%, or at least about 90%, or at least about 95%) of the NRC of the base structure independently.

Embodiment 16. A panel according to any of embodiments 1-15, wherein the coating layer has a thickness within the range of about 0.1 mm to about 10 mm, e.g., about 0.1 mm to about 8 mm, or about 0.25 mm to about 6 mm.

Embodiment 17. A panel according to any of embodiments 1-16, wherein the coating layer has an average cell diameter within the range of about 10 µm to about 500 µm, e.g., about 25 µm to about 500 µm, or about 50 µm to about 400 µm.

Embodiment 18. A panel according to any of embodiments 1-17, wherein the coating layer has a density within the range of about 0.01 g/cm$^3$ to about 0.5 g/cm$^3$, e.g., about 0.01 g/cm$^3$ to about 0.35 g/cm$^3$, or about 0.05 g/cm$^3$ to about 0.25 g/cm$^3$.

Embodiment 19. A panel according to any of embodiments 1-18, wherein the coating layer comprises
  one or more foamable polymers (e.g., one or more of a rubber polymer and a plastic polymer); and
  one or more of a dispersant, a coalescing aid, and a foaming surfactant;
  present in the layer in a combined amount of at least about 30 wt. %, e.g., at least about 40 wt. %, or at least about 50 wt. %, or at least about 60 wt. %, or at least about 70 wt. %.

Embodiment 20. A panel according to embodiment 19, wherein the plastic polymer is an acrylic polymer.

Embodiment 21. A panel according to embodiment 19, wherein the rubber polymer is a styrene butadiene copolymer.

Embodiment 22. A panel according to embodiment 19, wherein the foamable polymer is a polyacrylate such as poly(methyl methacrylate), poly(ethyl acrylate), poly(butyl acrylate), poly(acrylic acid), polystyrene, poly vinyl acetate or poly vinyl alcohol.

Embodiment 23. A panel according to embodiment 19, wherein the foamable polymer is selected from polyurethanes, polyacrylates, styrene-acrylate copolymers, styrene-ethylene-butadiene-styrene block copolymer (SEBS), poly(vinyl acetate) (PVAc), poly(ethylene-vinyl acetate) (EVA), ethylene-vinyl chloride copolymers.

Embodiment 24. A panel according to any of embodiments 19-23, wherein the coating layer further comprises a filler.

Embodiment 25. A panel according to embodiment 24, wherein the filler is calcium carbonate.

Embodiment 26. A panel according to embodiment 24 or 25, wherein the filler is present in the coating layer in an amount within the range of about 1 wt. % to about 60 wt. %, e.g., about 10 wt. % to about 60%, or about 15 wt. % to about 50 wt. %.

Embodiment 27. A panel according to any of embodiments 19-26, wherein the coating layer further comprises a pigment.

Embodiment 28. A panel according to embodiment 27, wherein the pigment is selected from titanium dioxide, zinc oxide, and carbon black.

Embodiment 29. A panel according to embodiment 27 or 28, wherein the pigment is present in the coating layer in an amount within the range of about 0.5 wt. % to about 20 wt. %, e.g., about 2.5 wt. % to about 15 wt. %.

Embodiment 30. A panel according to any of embodiments 19-29, wherein the coating layer formed of an open-cell foam comprises
  foamable polymer (e.g., acrylic polymer, styrene butadiene polymer, or a mixture thereof), present in the coating layer in an amount within the range of about 20 wt. % to about 80 wt. %, e.g., about 25 wt. % to about 70 wt. %, or about 30 wt. % to about 60 wt. %;

a dispersant, present in the coating layer in an amount within the range of about 0.1 wt. % to about 10 wt. %, e.g., about 0.5 wt. % to about 8 wt. %;

a coalescing agent, present in the coating layer in an amount within the range of about 0.1 wt. % to about 10 wt., e.g., about 0.5 wt. % to about 8 wt. %; and a foaming surfactant, present in the coating layer in an amount within the range of about 0.25 wt. % to about 15 wt. %, e.g., about 1 wt. % to about 12 wt. %.

Embodiment 31. A panel according to embodiment 30, wherein the coating layer further comprises a filler, present in the foam in an amount within the range of about 1 wt. % to about 60 wt. %, e.g., about 15 wt. % to about 45 wt. %; and a pigment, present in the foam in an amount within the range of about 0.5 wt. % to about 20 wt. %, e.g., about 2.5 wt. % to about 15 wt. %.

Embodiment 32. A panel according to any of embodiments 1-31, wherein the coating layer comprises a plurality of particles having an average particle size within the range of about 1 μm to about 50 μm (e.g., about 1 μm to about 40 μm, or about 5 μm to about 30 μm) or about 0.1 mm to about 10 mm (e.g., about 0.1 mm to about 8 mm, or about 0.5 mm to about 6 mm).

Embodiment 33. A panel according to any of embodiments 19-32, wherein the total amount of the foamable polymer, dispersant, coalescing aid, foaming surfactant, filler, pigment, and crosslinking agent is at least about 85 wt. % (e.g., at least about 90 wt. %, or at least about 95 wt. %, or at least about 97.5 wt. %, or at least about 99 wt. %) of the coating layer.

Embodiment 34. A panel according to embodiment 33, wherein the color of the exterior major surface is white or black.

Embodiment 35. A panel according to any of embodiments 1-34, wherein the exterior major surface of the coating layer has a gloss of less than about 20 gloss units (GU), e.g. less than about 15 GU, or less than about 10 GU.

Embodiment 36. A panel according to any of embodiments 1-36, wherein the panel is resistant to sagging.

Embodiment 37. A method for preparing an acoustic panel according to any of embodiments 1-36, comprising providing a base structure having one or more edges, an outward major surface having a total area, and an inward major surface opposing the outward major surface, the base structure having independently an NRC of at least about 0.3;

coating, directly onto the outward major surface, a frothed composition comprising an aqueous suspension of one or more foamable polymers (e.g., one or more of a rubber polymer and a plastic polymer), and one or more of a dispersant, a coalescing aid, and a foaming surfactant, present in the composition in a combined amount of at least about 50%, e.g., at least about 60%, or at least about 70%, or at least about 80%, or at least about 90%; and drying the coated frothed composition to provide a coating layer formed of an open-cell foam, the coating layer having an exterior major surface opposing the outward major surface of the base structure.

Embodiment 38. A method according to embodiment 37, wherein the base structure comprises a plurality of perforations extending from the outward major surface towards the inward major surface, the plurality of perforations occupying an area of the outward major surface within the range of about 0.1% to about 10% of the total area of the outward major surface.

Embodiment 39. A method according to embodiment 37 or 38, wherein the frothed composition has a density within the range of about 0.01 $g/cm^3$ to about 0.5 $g/cm^3$, e.g., about 0.01 $g/cm^3$ to about 0.35 $g/cm^3$, or about 0.05 $g/cm^3$ to about 0.25 $g/cm^3$.

Embodiment 40. A method according to any of embodiments 37-39, wherein the rubber polymer is a styrene butadiene copolymer.

Embodiment 41. A method according to any of embodiments 37-39, wherein the plastic polymer is an acrylic polymer.

Embodiment 42. A method according to any of embodiments 37-39, wherein the foamable polymer is a polyacrylate such as poly(methyl methacrylate), poly(ethyl acrylate), poly(butyl acrylate), poly(acrylic acid), polystyrene, poly vinyl acetate or poly vinyl alcohol.

Embodiment 43. A method according to any of embodiments 37-39, wherein the foamable polymer is selected from polyurethanes, polyacrylates, styrene-acrylate copolymers, styrene-ethylene-butadiene-styrene block copolymer (SEBS), poly(vinyl acetate) (PVAc), poly(ethylene-vinyl acetate) (EVA), ethylene-vinyl chloride copolymers.

Embodiment 44. A method according to any of embodiments 37-43, wherein the frothed composition further comprises a filler.

Embodiment 45. A method according to embodiment 44, wherein the filler is calcium carbonate.

Embodiment 46. A method according to embodiment 44 or 45, wherein the filler is present in the frothed composition in an amount within the range of about 5 wt. % to about 50 wt. %, e.g., about 10 wt. % to about 40%, or about 15 wt. % to about 30 wt. %.

Embodiment 47. A method according to any of embodiments 37-46, wherein the frothed composition further comprises a pigment.

Embodiment 48. A method according to embodiment 46 wherein the pigment is selected from titanium dioxide, zinc oxide, and carbon black.

Embodiment 49. A method according to embodiment 46 or 47, wherein the pigment is present in the frothed composition in an amount within the range of about 0.5 wt. % to about 20 wt. %, e.g., about 2.5 wt. % to about 15 wt. %.

Embodiment 50. A method according to any of embodiments 36-49, wherein the frothed composition comprises a plurality of particles having an average particle size within the range of about 1 μm to about 50 μm (e.g., about 1 μm to about 40 μm, or about 5 μm to about 30 μm) or about 0.1 mm to about 10 mm (e.g., about 0.1 mm to about 8 mm, or about 0.5 mm to about 6 mm).

Embodiment 51. A method according to any of embodiments 37-50, wherein the total amount of the aqueous suspension of one or more of a rubber polymer and a plastic polymer, dispersant, coalescing aid, foaming surfactant, filler, pigment, and crosslinking agent is at least about 85 wt. % (e.g., at least about 90 wt. %, or at least about 95 wt. %, or at least about 97.5 wt. %, or at least about 99 wt. %) of the frothed composition.

Embodiment 52. A method according to any of embodiments 37-51, wherein the thickness of the coated frothed composition before drying is within the range of about 0.25 mm to about 25 mm, e.g., about 0.25 mm to about 20 mm, or about 0.5 mm to about 15 mm.

Embodiment 53. A method according to any of embodiments 37-52, wherein coating the frothed composition comprises applying the composition to the outward major surface of the base structure with a knife coater, roll coater, or a spray coater.

Embodiment 54. A method according to any of embodiments 37-53, wherein the drying temperature is within the range of about 50° C. to about 350° C., e.g., about 50° C. to about 300° C., or about 100° C. to about 250° C.

Embodiment 55. A method according to any of embodiments 37-54, further comprising roughening the exterior major surface of the coating layer after drying the coated frothed composition.

Embodiment 56. An acoustic panel according to any of embodiments 1-36, made by a method of any of embodiments 37-55.

Embodiment 57. A panel system comprising:
  a plurality of support beams arranged in a support grid so as to form a plurality of grid openings in the support grid; and
  a plurality of panels respectively aligned with the openings of the support grid, the plurality of panels including a first acoustic panel according to any of embodiments 1-36 or 56, wherein the first acoustic panel is oriented such that the exterior major surface of the facing layer is facing an interior space adjacent to the support grid.

Embodiment 58. The panel system according to embodiment 57, wherein the panel system is a ceiling system and the support grid is a ceiling grid.

Embodiment 59. The panel system according embodiment 57 or embodiment 58, wherein each of the plurality of panels is an acoustic panel according to any of embodiments 1-36 or 56.

What is claimed is:

1. An acoustic panel comprising
  a base structure having one or more edges, an outward major surface having a total area, and an inward major surface opposing the outward major surface, the base structure having independently a noise reduction coefficient of at least about 0.3; and
  a coating layer directly disposed on the outward major surface of the base structure, the coating layer being formed of an open-cell foam, the coating layer having an exterior major surface opposing the outward major surface of the base structure,
wherein the coating layer is substantially scattering for light in the wavelength range 380-780 nm, and has an absorption coefficient of less than 0.5 for acoustic frequencies in the range of 100 Hz to 10,000 Hz.

2. A panel according to claim 1, wherein the base structure comprises
  one or more of mineral wool, fiberglass, gypsum, wood fiber, paper, cellulose fiber, wet-laid felt, and foam;
  one or more fillers; and
  one or more binders;
present in the base structure in a combined amount of at least about 85 wt. %.

3. A panel according to claim 1, wherein the base structure comprises a plurality of perforations extending from the outward major surface towards the inward major surface, the plurality of perforations occupying an area of the outward major surface within the range of about 0.1% to about 10% of the total area of the outward major surface.

4. A panel according to claim 3, wherein the perforations are annular, and the average diameter of the perforations is within the range of about 0.25 mm to about 5 mm, and wherein the average depth of the perforations is at least about 3 mm.

5. A panel according to claim 1, wherein the base structure and the coating layer each independently have an air resistivity, and the air resistivity of the coating layer is equal to or less than the air resistivity of the base structure, and, wherein the air resistivity of the coating layer is in a range of about 1 to about 2000 kPa·s/m².

6. A panel according to claim 1, wherein the coating layer has a light scattering percentage of at least about 80% for light in the wavelength region 380-780 nm.

7. A panel according to claim 1, having an NRC of at least about 0.3, e.g., at least about 0.5.

8. A panel according to claim 1, wherein the NRC of the panel is at least about 70% of the NRC of the base structure independently.

9. A panel according to claim 1, wherein the coating layer has a thickness within the range of about 0.1 mm to about 10 mm.

10. A panel according to claim 1, wherein the coating layer has an average cell diameter within the range of about 10 μm to about 500 μm.

11. A panel according to claim 1, wherein the coating layer has a density within the range of about 0.01 g/cm³ to about 0.5 g/cm³.

12. A panel according to claim 1, wherein the coating layer comprises
  one or more foamable polymers (e.g., one or more of a rubber polymer and a plastic polymer); and
  one or more of a dispersant, a coalescing aid, and a foaming surfactant;
present in the layer in a combined amount of at least about 30 wt. %.

13. A panel according to claim 12, wherein the one or more foamable polymers include one or more of polyurethanes, polyacrylates, styrene-acrylate copolymers, styrene-butadiene copolylmers, styrene-ethylene-butadiene-styrene block copolymer (SEBS), poly(vinyl acetate) (PVAc), poly(ethylene-vinyl acetate) (EVA), ethylene-vinyl chloride copolymers, polystyrene, and polyvinyl alcohol.

14. A panel according to claim 12, wherein the coating layer further comprises a filler, present in the coating layer in an amount within the range of about 1 wt. % to about 60 wt. %.

15. A panel according to claim 12, wherein the coating layer further comprises a pigment, present in the coating layer in an amount within the range of about 0.5 wt. % to about 20 wt. %.

16. A panel according to claim 12, wherein the coating layer formed of an open-cell foam comprises
  foamable polymer (e.g., acrylic polymer, styrene butadiene polymer, or a mixture thereof), present in the coating layer in an amount within the range of about 20 wt. % to about 80 wt. %;
  a dispersant, present in the coating layer in an amount within the range of about 0.1 wt. % to about 10 wt. %;
  a coalescing agent, present in the coating layer in an amount within the range of about 0.1 wt. % to about 10 wt. % and
  a foaming surfactant, present in the coating layer in an amount within the range of about 0.25 wt. % to about 15 wt. %.

17. A panel according to claim 1, wherein the exterior major surface of the coating layer has a gloss of less than about 20 gloss units (GU).

18. A panel according to claim 1, wherein the coating layer has an absorption coefficient of less than 0.3 for acoustic frequencies in the range of 100 Hz to 10,000 Hz.

19. A panel according to claim 1, wherein the base structure has an air resistivity that is at least 50% greater than an air resistivity of the coating layer.

20. A method for preparing an acoustic panel according to claim 1, comprising
- providing a base structure having one or more edges, an outward major surface having a total area, and an inward major surface opposing the outward major surface, the base structure having independently an NRC of at least about 0.3;
- coating, directly onto the outward major surface, a frothed composition comprising an aqueous suspension of one or more foamable polymers (e.g., one or more of a rubber polymer and a plastic polymer), and one or more of a dispersant, a coalescing aid, and a foaming surfactant, present in the composition in a combined amount of at least about 50%; and
- drying the coated frothed composition to provide a coating layer formed of an open-cell foam, the coating layer having an exterior major surface opposing the outward major surface of the base structure.

21. A method according to claim 20, further comprising roughening the exterior major surface of the coating layer after drying the coated frothed composition.

22. An acoustic panel according made by a method of claim 20.

23. A panel system comprising:
- a plurality of support beams arranged in a support grid so as to form a plurality of grid openings in the support grid; and
- a plurality of panels respectively aligned with the openings of the support grid, the plurality of panels including a first acoustic panel according to claim 1, wherein the first acoustic panel is oriented such that the exterior major surface of the facing layer is facing an interior space adjacent to the support grid.

* * * * *